(12) United States Patent
Park et al.

(10) Patent No.: US 8,094,603 B2
(45) Date of Patent: *Jan. 10, 2012

(54) APPARATUS AND METHOD FOR MODULATING OF ON-CHANNEL REPEATER

(75) Inventors: Sung-Ik Park, Daejon (KR); Yong-Tae Lee, Daejon (KR); Ho-Min Eum, Daejon (KR); Heung-Mook Kim, Daejon (KR); Jae-Hyun Seo, Daejon (KR); Seung-Won Kim, Daejon (KR); Soo-In Lee, Daejon (KR)

(73) Assignee: Electronics and Telecommunication Research Institute (KR)

( * ) Notice: Subject to any disclaimer, the term of this patent is extended or adjusted under 35 U.S.C. 154(b) by 709 days.

This patent is subject to a terminal disclaimer.

(21) Appl. No.: 10/586,825

(22) PCT Filed: Dec. 31, 2004

(86) PCT No.: PCT/KR2004/003559
§ 371 (c)(1),
(2), (4) Date: Aug. 14, 2008

(87) PCT Pub. No.: WO2005/069616
PCT Pub. Date: Jul. 28, 2005

(65) Prior Publication Data
US 2008/0298295 A1 Dec. 4, 2008

(30) Foreign Application Priority Data
Jan. 19, 2004 (KR) .................. 10-2004-0003741

(51) Int. Cl.
*H04J 1/10* (2006.01)
(52) U.S. Cl. ........ 370/315; 455/260; 455/265; 455/504; 375/211; 375/142

(58) Field of Classification Search .................. 370/315; 455/260, 265, 504; 375/211, 142
See application file for complete search history.

(56) References Cited

U.S. PATENT DOCUMENTS
5,406,586 A * 4/1995 Wang ............................ 375/343
(Continued)

FOREIGN PATENT DOCUMENTS
CN 86207134 U 7/1987
(Continued)

OTHER PUBLICATIONS

Behzad Razavi, "RF Transmitter Architectures and Circuits", IEEE 1999 Custom Integrated Circuts Conference, pp. 197-204.*
Behzad Razavi, "Challenges in Portable RF Transceiver Design", IEEE Magazine, Sep. 1996, pp. 13-25.*
"On-Channel Repeater for Digital Television Broadcasting Service" by Khalil Salehian et al.; *IEEE Transactions on Broadcasting*, vol. 48, No. 2, Jun. 2002; pp. 97-102.

*Primary Examiner* — Jinsong Hu
*Assistant Examiner* — Qun Shen
(74) *Attorney, Agent, or Firm* — Blakely, Sokoloff, Taylor & Zafman

(57) ABSTRACT

Provided is a modulating apparatus and method of an on-channel repeater. An object of the present invention is to provide a modulating apparatus of an on-channel repeater for reducing time delay by configuring and up-sampling a baseband signal, filtering the up-sampled baseband signal with an Equi-Ripple (ER) filter or in a window method, and converting the filtered baseband signal into an RF signal. The modulating apparatus includes: a baseband signal configuring unit for configuring a baseband. signal by combining an input field and a segment sync signal; a pilot adding unit for adding a pilot signal to the baseband signal; a filtering unit for filtering the baseband signal with the pilot signal; and an RF up-converting unit for up-converting the filtered signal into an RF signal. The present invention is used to form an on-channel repeating network in a transmitting system including a digital TV broadcasting system.

6 Claims, 6 Drawing Sheets

U.S. PATENT DOCUMENTS

| | | | | |
|---|---|---|---|---|
| 5,414,728 A | * | 5/1995 | Zehavi | 375/142 |
| 5,737,361 A | * | 4/1998 | Park et al. | 375/149 |
| 5,828,954 A | * | 10/1998 | Wang | 455/260 |
| 6,128,539 A | * | 10/2000 | Markandey et al. | 700/29 |
| 6,505,032 B1 | * | 1/2003 | McCorkle et al. | 455/41.2 |
| 6,618,443 B1 | * | 9/2003 | Kim et al. | 375/240.21 |
| 6,658,261 B1 | * | 12/2003 | Winters et al. | 455/504 |
| 6,678,320 B1 | * | 1/2004 | Aydin | 375/235 |
| 7,301,994 B2 | * | 11/2007 | Park et al. | 375/211 |
| 7,965,761 B2 | * | 6/2011 | Shattil | 375/147 |
| 2005/0094717 A1 | * | 5/2005 | Park et al. | 375/211 |

FOREIGN PATENT DOCUMENTS

| | | |
|---|---|---|
| CN | 1345133 A | 4/2002 |
| KR | 2002-0088304 | 11/2002 |
| KR | 10-2004-0090603 A | 10/2004 |

* cited by examiner

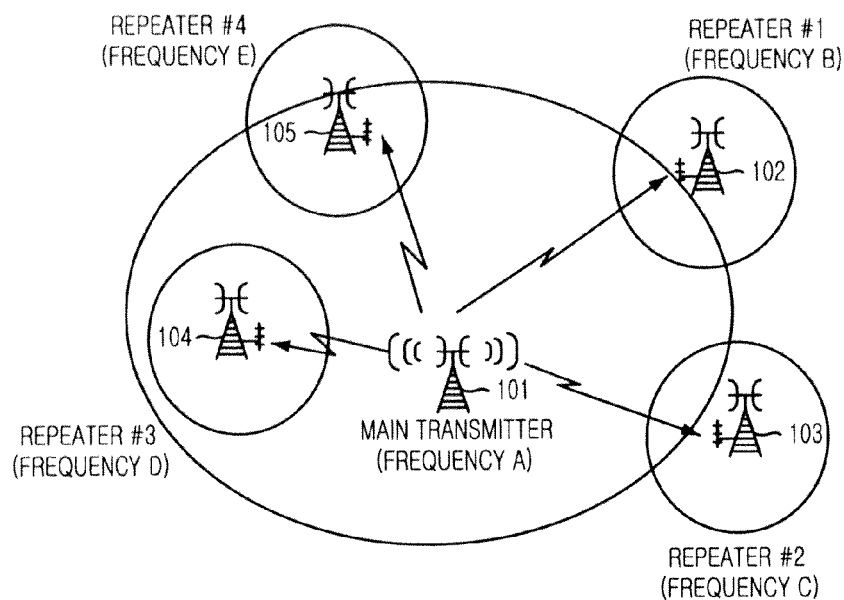
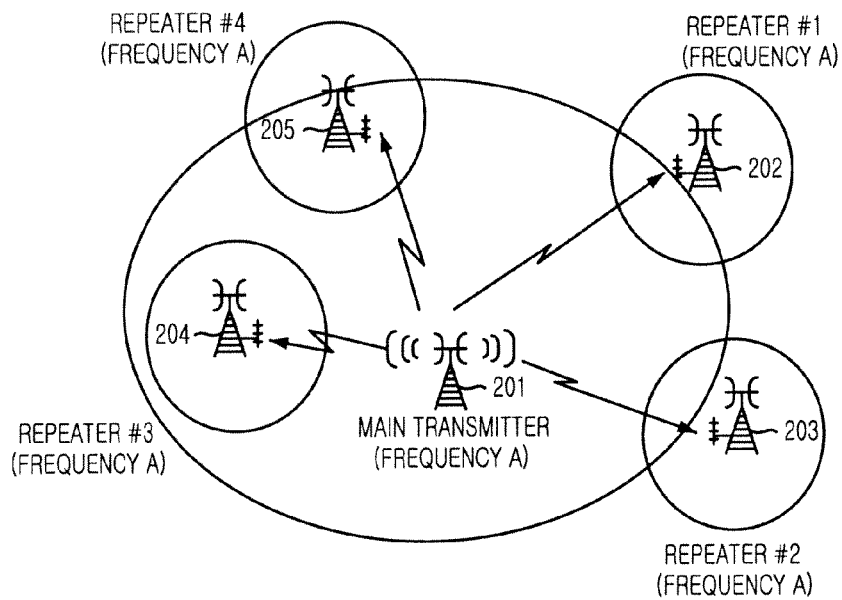

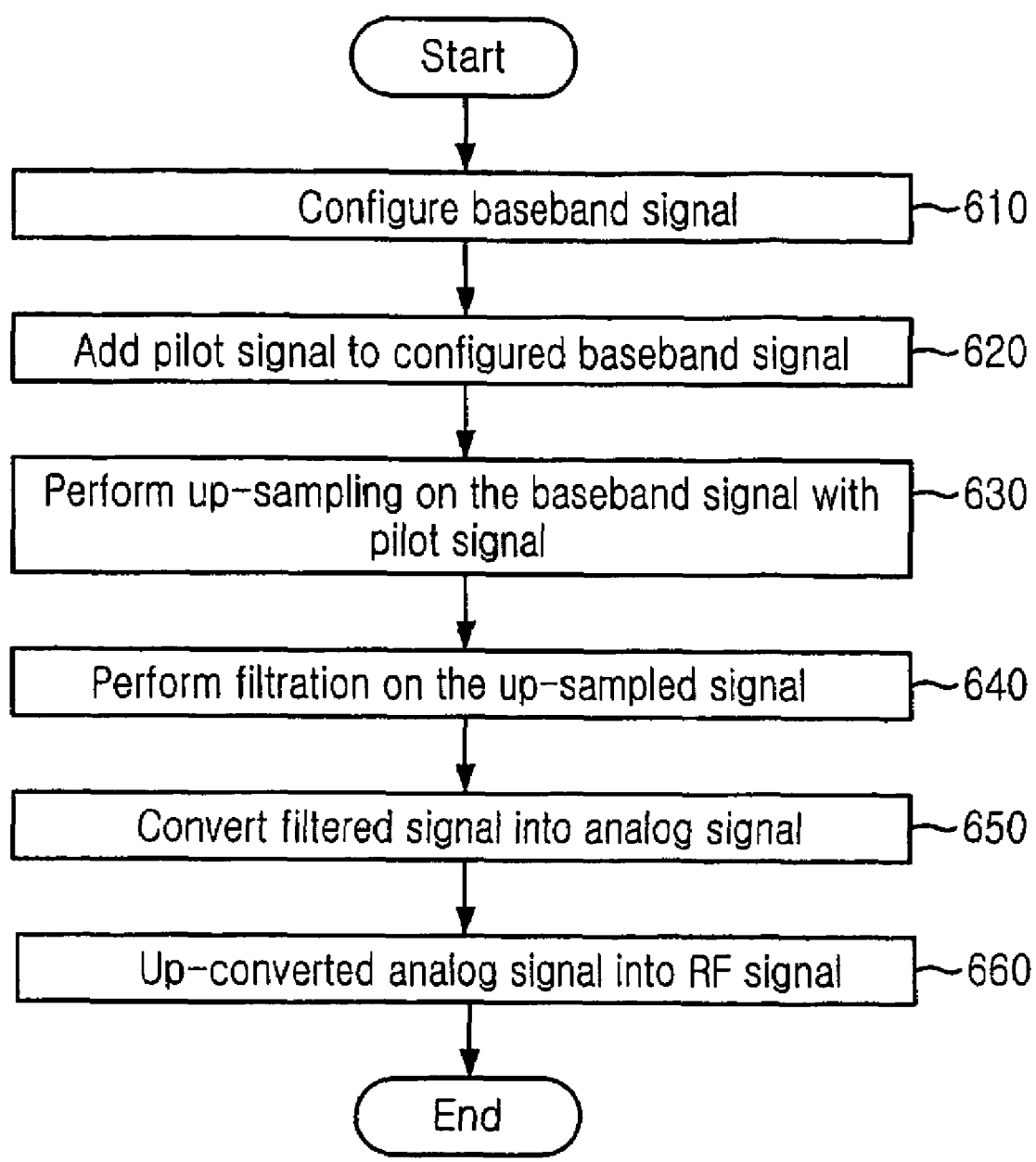

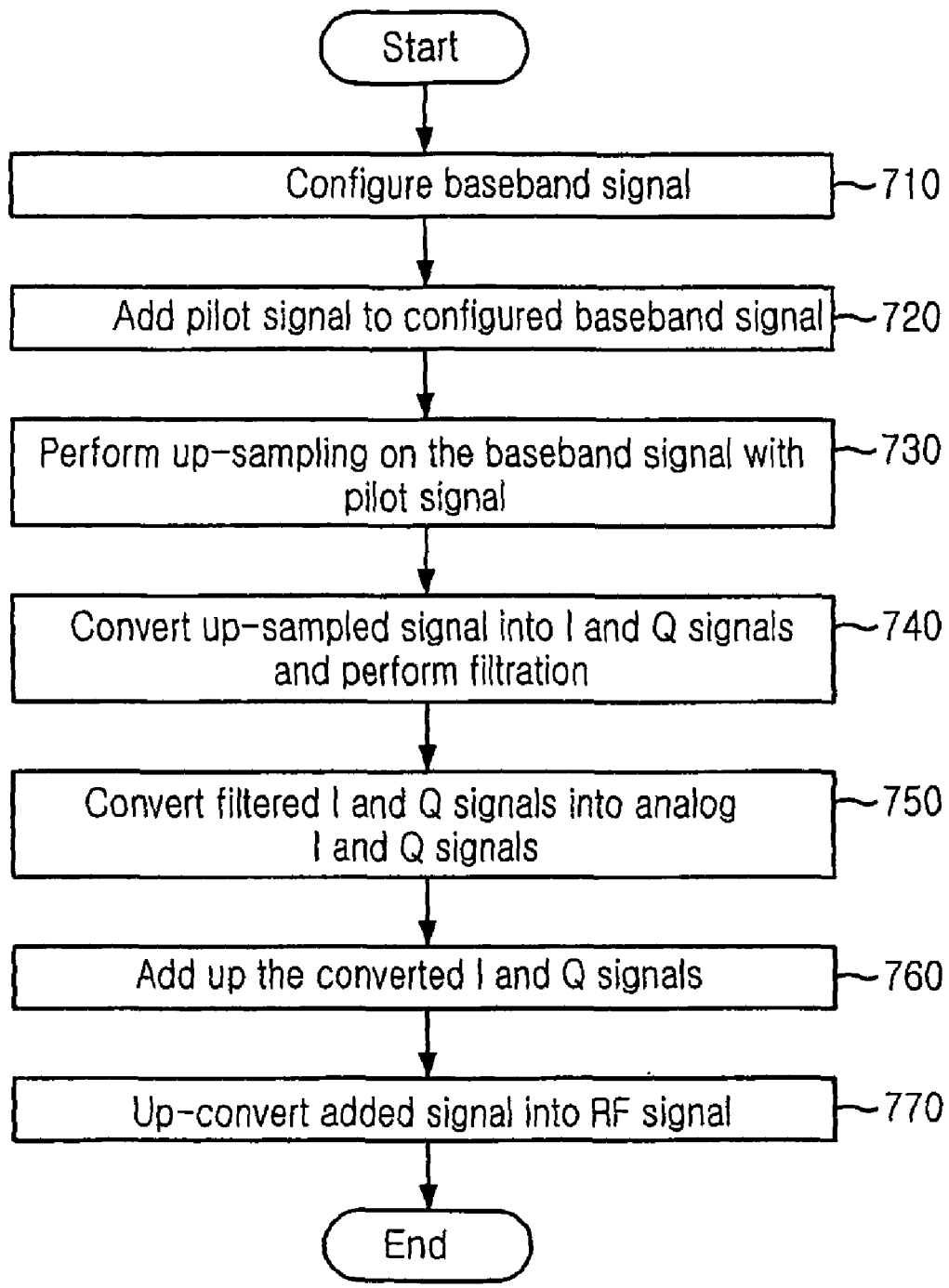

APPARATUS AND METHOD FOR MODULATING OF ON-CHANNEL REPEATER

The present patent application is a non-provisional application of International Application No. PCT/KR2004/003559, filed Dec. 31, 2004.

TECHNICAL FIELD

The present invention relates to a modulating apparatus and method of an on-channel repeater; and, more particularly, to a modulating apparatus of an on-channel repeater that modulates baseband signals into radio frequency (RF) signals in an on-channel repeater which receives the signal of a main transmitter/other repeaters on one channel and distributes the signal on the same channel, and a modulating method thereof.

BACKGROUND ART

Generally, main transmitters and repeaters are set up according to surrounding geographical features/objects and service areas. A repeater is set up in an area where signals from a main transmitter are received weakly to thereby resolve a problem of the area with trouble in signal reception, which is referred to as a weak-signal reception area, and broaden the coverage of the signals transmitted from the main transmitter.

FIG. 1 is a diagram illustrating a service using conventional repeaters in accordance with an embodiment of a prior art, where repeaters repeats signals by using different frequencies.

In the service using conventional repeaters as shown in FIG. 1, first, a signal is transmitted from a main transmitter 101 through a transmission frequency A and repeaters 102 to 105 repeat the signal in frequencies B, C, D and E which are different from the transmission frequency A. However, since the repeaters of FIG. 1 resolve the problem of a weak-signal reception area where the signal from the main transmitter 101 is received weakly and broaden the service coverage by giving different frequencies B, C, D and E to the respective repeaters 102 to 105, the repeaters 102 to 105 use a plurality of frequency bands, and this requires many frequency resources. Thus, it is quite inefficient in the respect of using frequencies.

FIG. 2 is a diagram illustrating a service using conventional repeaters in accordance with another embodiment of a prior art. It presents a conceptual view of a service using on-channel repeaters which repeat signals in the same frequency. In other words, the main transmitter 201 transmits a signal through a transmission frequency A, and the repeaters 202 to 205 repeat the signal through the same frequency as the transmission frequency A. To provide the service, a receiver should be able to discern signals transmitted from the main transmitter 201 and the on-channel repeaters 202 and 205.

Generally, a receiver includes an equalizer for correcting signal distortion in a transmission channel by equalizing the received signal. The equalizer of the receiver can remove a signal that is received after temporally delayed other than a desired signal in the same frequency band.

Thus, the service using the on-channel repeaters requires a precondition that the time delay between signals transmitted from the main transmitter and the on-channel repeaters should be small. That is, the time delay of the on-channel repeaters should be minimized.

Meanwhile, on-channel repeaters generally repeat an inputted radio frequency (RF) signal through an on-channel by demodulating the inputted RF signal into a baseband signal to remove noise and modulating the noise-free signal into the RF signal again.

FIG. 3 is a block diagram describing a modulating apparatus of a conventional on-channel repeater.

As illustrated in FIG. 3, the modulating apparatus of a conventional on-channel repeater includes a baseband signal configuring unit 310 for configuring a baseband signal by combining a field and segment sync signal, a pilot adding unit 320 for adding a pilot signal to the above configured baseband signal, an up-sampling unit 330 for up-sampling the baseband signal with the pilot signal added thereto, a filtering unit 340 for converting the up-sampled baseband signal into an in-phase (I) signal and a quadrature (Q) signal and performing filtration with a Square Root Raised Cosine (SRRC) filter, an intermediate frequency (IF) up-converting unit 350 for up-converting the filtered baseband I and Q signals into I and Q signals of an IF band, an adding unit 360 for adding the up-converted IF band I and Q signals, and a Digital-to-analog converter (DAC) 370 for converting a digital IF signal into an analog IF signal.

Herein, the filtering unit 340 is formed of an I filter [g(n)·cos(2π·f·nT)] 341 and a Q filter [g(n)·sin(2π·f·nT)] 342. Herein, the frequency f is 5.38 MHz and g(n) denotes, a transfer function of the SRRC filter.

Also, the IF up-converting unit 350 is formed of an I signal up-converter 351 to be multiplied by $\cos(2\pi \cdot f_{IF} \cdot nT)$ and a Q signal up-converter 352 to be multiplied by $\sin(2\pi \cdot f_{IF} \cdot nT)$. Herein, the frequency $f_{IF}$ is a frequency that up-converts the frequency of a filtered signal into the IF band frequency.

Meanwhile, a signal generated by a filtering unit 340 of FIG. 3 should satisfy a spectrum standard which is called Spectrum Mask. When an up-sampling rate is 4, the filtering unit 340 using an SRRC filter can satisfy the spectrum standard only when it uses an SRRC filter of more than 500 taps.

Herein, the time delay caused by the filtering unit 340, which is a time delay device, is determined based on the number of used filter taps. For example, when it is assumed that the I filter 341 and the Q filter 342 which form the filtering unit 340 have N taps and M taps, respectively, the I filter 341 and the Q filter 342 generate time delay of N/2 and M/2, respectively.

If the I filter 341 and the Q filter 342 are all SRRC filters, the two filters 341 and 342 have the same tap number and, since the I filter 341 and the Q filter 342 has a parallel structure, the total time delay caused by the filtering unit 340 is as much as N/2 (or M/2). After all, a filtering unit 340 using an SRRC filter having more than 500 taps to satisfy the spectrum standard generates time delay of 250 (=500/2). Since the time delay goes out of the time delay removal capability of the equalizer in the receiver, the receiver cannot discern the output signal of the main transmitter from the output signals of the on-channel repeaters.

Therefore, it is desperately needed to develop a modulating apparatus having a short time delay between the output signal of the on-channel repeaters and the output signals of the main transmitter, that is, a modulating apparatus that can reduce the time delay of the on-channel repeaters.

DISCLOSURE

Technical Problem

It is, therefore, an object of the present invention to provide a modulating apparatus of an on-channel repeater for reducing time delay by configuring and up-sampling a baseband signal, filtering the up-sampled baseband signal with an Equi- Ripple (ER) filter or in a window method, and converting the filtered baseband signal into a radio frequency (RF) signal.

The above and other objects and advantageous features of the present invention will become apparent from the following description of the preferred embodiments of the present invention. Also, it can be easily understood that the objects and advantages of the present invention can be realized by the means described in the claims and combinations thereof.

Technical Solution

In accordance with one aspect of the present invention, there is provided a modulating apparatus of an on-channel repeater which receives the signal on one channel and distributes the signal on the same channel, which includes: a baseband signal configuring unit for configuring a baseband signal by combining an input field and a segment sync signal; a pilot adding unit for adding a pilot signal to the baseband signal; a filtering unit for filtering the baseband signal with the pilot signal added thereto; and a radio frequency (RF) up-converting unit for up-converting the filtered signal into an RF signal.

In accordance with one aspect of the present invention, there is provided a modulating method of an on-channel repeater which receives the signal on one channel and distributes the signal on the same channel, which includes: a baseband signal configuring step of configuring a baseband signal by combining an input field and a segment sync signal; a pilot adding step of adding a pilot signal to the baseband signal; a filtering step of filtering the baseband signal with the pilot signal added thereto; and a radio frequency (RF) up-converting step of up-converting the filtered signal into an RF signal.

Advantageous Effects

The present invention has an advantageous effect that a receiver can discern between output signals of an on-channel repeater and output signals from a main transmitter by modulating a received signal to have a short time delay.

DESCRIPTION OF DRAWINGS

The above and other objects and features of the present invention will become apparent from the following description of the preferred embodiments given in conjunction with the accompanying drawings, in which:

FIG. 1 is a diagram illustrating a service using conventional repeaters in accordance with an embodiment of a prior art;

FIG. 2 is a diagram illustrating a service using conventional repeaters in accordance with another embodiment of a prior art;

FIG. 6 is a flowchart describing a modulating method in an on-channel repeater shown of FIG. 4 in accordance with an embodiment of the present invention; and FIG. 7 is a flowchart describing a modulating method in an on-channel repeater shown of FIG. 5.

DESCRIPTION OF ESSENTIAL PARTS OF THE DRAWINGS

410: baseband signal configuring unit
420: pilot adding unit

430: up-sampling unit
440: VSB filtering unit
450: DAC
460: RF up-converting unit

BEST MODE FOR THE INVENTION

Other objects and aspects of the invention will become apparent from the following description of the embodiments with reference to the accompanying drawings, and the technical concept and scope of the present invention can be easily realized by those skilled in the art. Also, when it is considered that detailed description on a prior art related to the present invention may blur the point of the present invention, it will be omitted. Hereinafter, preferred embodiments of the present invention will be described in detail with reference to the accompanying drawings.

Before the start of the description on the present invention, a modulating apparatus and method of an on-channel repeater, which is suggested in the present invention, is suitable for a digital television (TV) broadcasting, e.g., Advanced Television System Committee (ATSC) and Digital Video Broadcasting (DVB), but the present invention is not limited to it, and it is made clear that the present invention can be applied to an environment where a repeater is needed to form a general signal frequency network.

Figure 3:
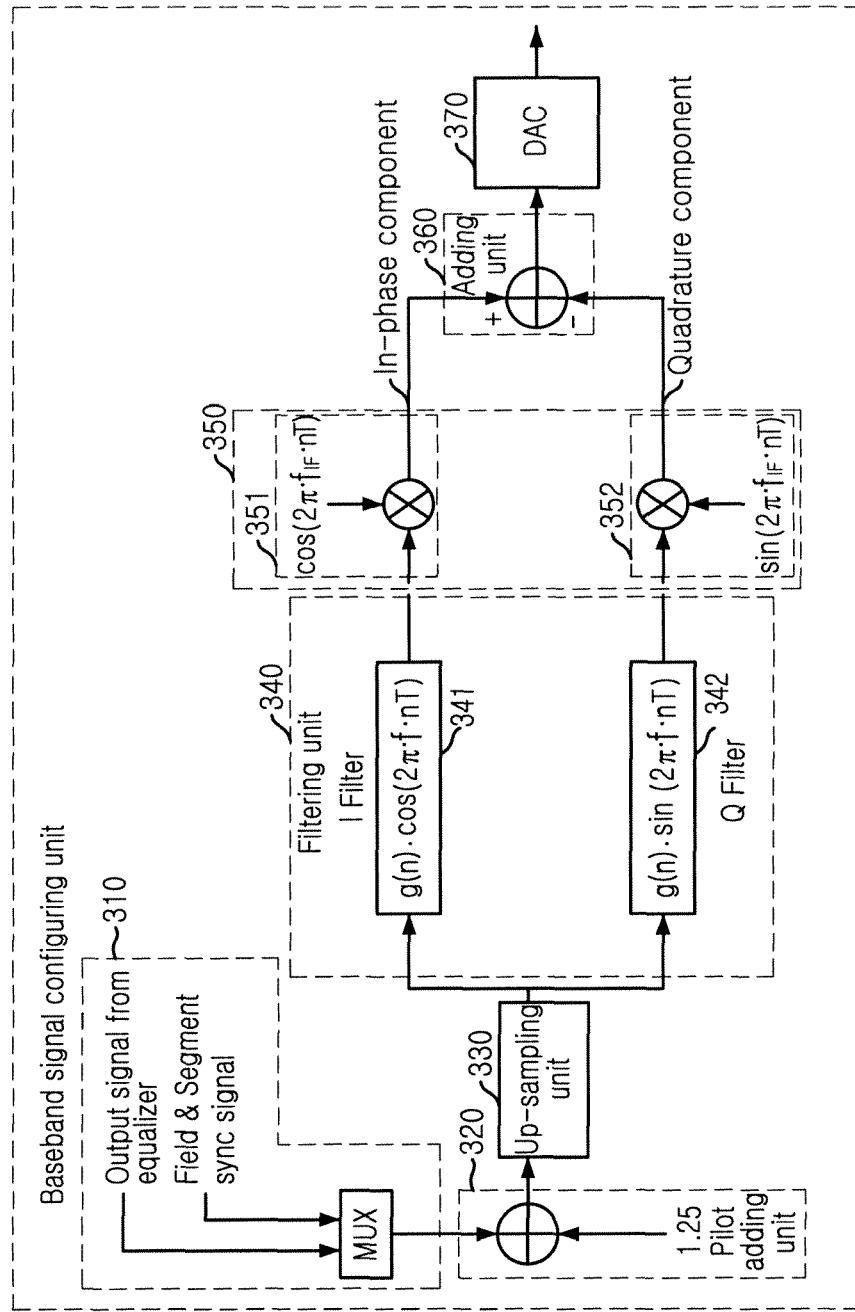
FIG. 3 is a block diagram describing a modulating apparatus of a conventional on-channel repeater.
Figure 4:
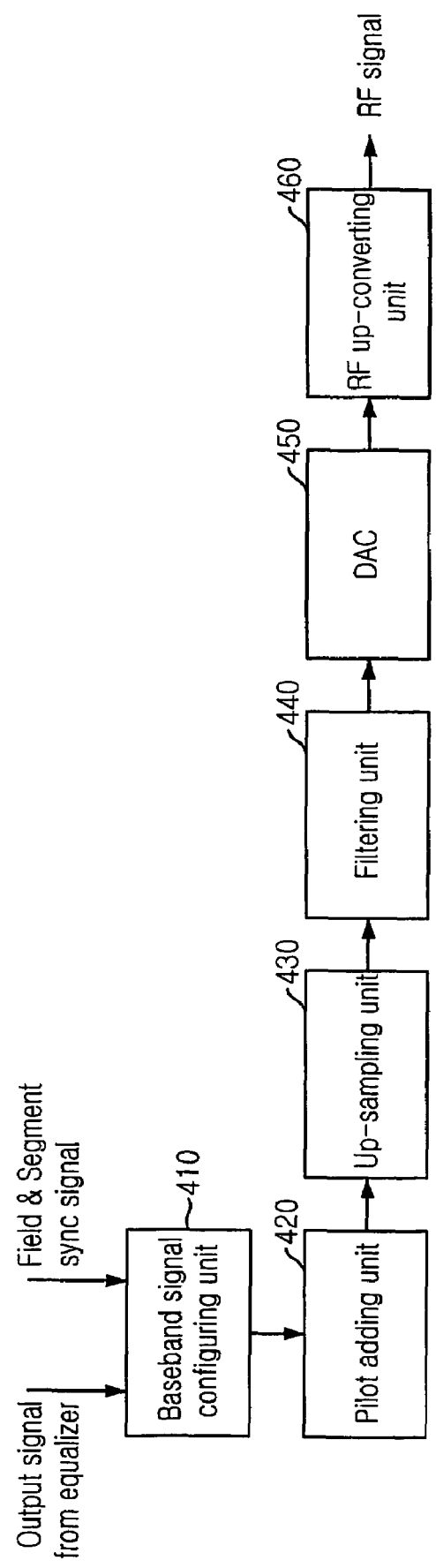
FIG. 4 is a block diagram showing a modulating apparatus of an on-channel repeater in accordance with an embodiment of the present invention.

FIG. 4 is a block diagram showing a modulating apparatus of an on-channel repeater in accordance with an embodiment of the present invention.

The modulating apparatus of the on-channel repeater illustrated in FIG. 4 includes a baseband signal configuring unit 410, a pilot adding unit 420, an up-sampling unit 430, a filtering unit 440, a Digital-to-analog converter (DAC) 450, and an RF up-converting unit 460.

The baseband signal configuring unit 410 configures a baseband signal by combining an output signal of an equalizer used in the on-channel repeater, a field, and a segment sync signal. The pilot adding unit 420 adds a pilot signal to the baseband signal configured in the baseband signal configuring unit 410.

Meanwhile, the up-sampling unit 430 up-samples the baseband signal with the pilot signal, and the filtering unit 440 filters the up-sampled baseband signal. Herein, the filtering unit 440 performs the filtration by using an Equi-Ripple (ER) filter and a window method or by using a Square Root Raised Cosine (SRRC) and the window method. Also, it can perform the filtration only by using the ER filter.

Also, the DAC 450 converts the baseband digital signal filtered in the filtering unit 440 into an analog signal, and the RF up-converting unit 460 up-converts the baseband analog signal converted in the DAC 450 into a radio frequency (RF) signal.

FIG. 6 is a flowchart describing a modulating method in an on-channel repeater shown of FIG. 4 in accordance with an embodiment of the present invention.

As shown in FIG. 6, at step 610, the modulating method of the on-channel repeater which is suggested in the present invention starts with configuring a baseband signal by combining an output signal of an equalizer used in the on-channel repeater, a field, and a segment sync signal.

Subsequently, at step 620, a pilot signal is added to the configured baseband signal and, at step 630, the baseband signal with the pilot signal added thereto is up-sampled.

Then, at step 640, the up-sampled baseband signal is filtered and, at step 650, the filtered signal is converted to the analog signal. Herein, the filtering at the 640 is performed by using the ER filter and a window method, or it can be performed by using an SRRC filter and the window method. Also, it is possible to perform the filtration only by using the ER filter.

Finally, at step 660, the converted analog signal is up-converted into an RF signal.

Figure 5:
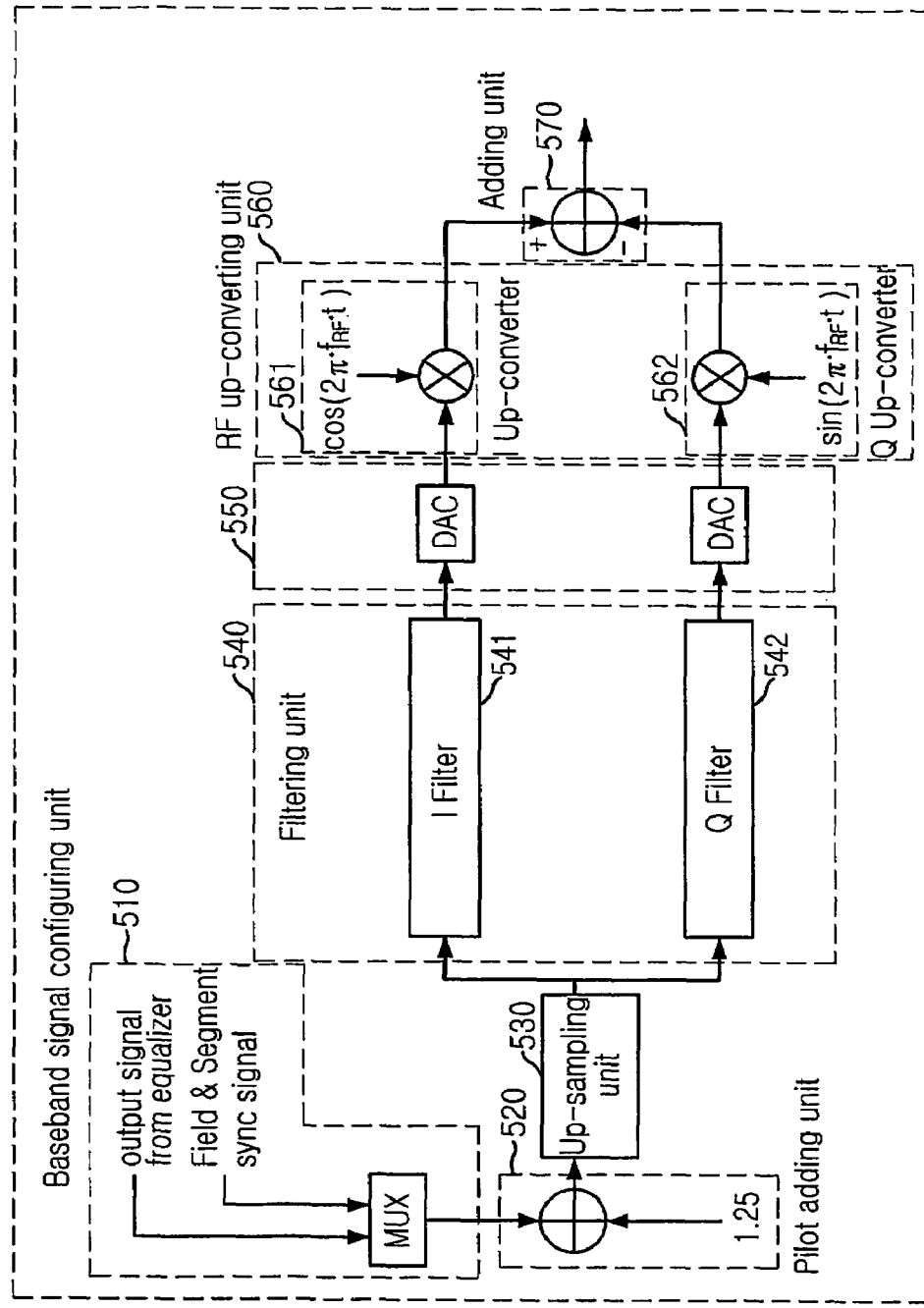
FIG. 5 is a block diagram illustrating a modulating apparatus of an on-channel repeater in accordance with another embodiment of the present invention.

FIG. 5 is a block diagram illustrating a modulating apparatus of an on-channel repeater in accordance with another embodiment of the present invention.

The modulating apparatus of the on-channel repeater illustrated in FIG. 5 includes a baseband signal configuring unit 510, a pilot adding unit 520, an up-sampling unit 530, a filtering unit 540, a DAC 550, and an RF up-converting unit 560.

The baseband signal configuring unit 510 configures a baseband signal by combining an output signal of an equalizer used in the on-channel repeater, a field, and a segment sync signal. The pilot adding unit 520 adds a pilot signal to the baseband signal configured in the baseband signal configuring unit 510.

Meanwhile, the filtering unit 540 converts the up-sampled baseband signal into an in-phase (I) signal and a quadrature (Q) signal and filters an I signal and a Q signal obtained from the conversion through the I filter 541 and the Q filter 542. Herein, the I filter 541 and the Q filter 542 can perform filtration by using the ER filter and the window method, or they can perform the filtration only by using the ER filter. Also, it can perform the filtration only by using the ER filter.

For the sake of convenience, the present invention is described by taking a case where the filtering unit 540 performs the filtration by using the ER filter and the window method as an example.

The I filter 541 of the filtering unit 540 is operated as shown in Equation 1, and the Q filter 542 is operated as shown in Equation 2.

$$[e(n)*\cos(2\pi \cdot f \cdot nT)] \cdot w(n) \quad \text{Eq. 1}$$

$$[e(n)*\sin(2\pi \cdot f \cdot nT)] \cdot w(n) \quad \text{Eq. 2}$$

wherein e(n) denotes a transfer function of the ER filter; frequency f is 2.69 MHz; * denotes a convolutional operation; and w(n) denotes a window function and diverse window functions, e.g., Kaiser, Hamming, Hanning, and Blackman, can be used.

Meanwhile, the DAC 550 converts baseband digital I and Q signals filtered in the filtering unit 540 into baseband analog I and Q signals.

The RF up-converting unit 560 directly converts the baseband analog I and Q signals converted in the DAC 550 into RF I and Q signals without passing through the intermediate frequency (IF) band.

Therefore, as illustrated in FIG. 5, the RF up-converting unit 560 includes an I up-converter 561 for multiplying the baseband analog I signal by $\cos(2\pi \cdot f_{RF} \cdot t)$ and a Q up-converter 562 for multiplying the baseband analog Q signal by $\sin(2\pi \cdot f_{RF} \cdot t)$. Herein, the frequency $f_{RF}$ is a frequency that up-converts a filtered signal.

An adding unit 570 adds up RF I and Q signals up-converted in the RF up-converting unit 560 to transform them into an analog RF signal.

FIG. 7 is a flowchart describing a modulating method in an on-channel repeater shown in FIG. 5.

As illustrated in FIG. 7, the modulating method of the on-channel repeater, which is suggested in the present invention, begins with configuring a baseband signal at step 710 by combining an output signal from an equalizer of the on-channel repeater, a field and a segment sync signal.

Subsequently, at step 720, a pilot signal is added to the configured baseband signal and, at step 730, the baseband signal with the pilot signal is up-sampled.

Then, at step 740, the up-sampled baseband signal is converted into I and Q signals and filtration is carried out and, at step 750, the filtered I and Q signals are transformed into analog I and Q signals. Herein, the filtration of the step 740 can be carried out by using an ER filter and a window method, or it can be carried out by using an SRRC filter and the window method. Also, the filtration can be performed by using the ER filter only.

Subsequently, at step 760, the transformed I and Q signals are added up and, at step 770, the added baseband signal is up-converted into RF signals.

The modulating apparatus of an on-channel repeater which is described in FIGS. 4 and 5 includes one time delay device, i.e., filtering units 440 and 540.

However, since the filtering units 440 and 540 of the modulating apparatus of the present invention use the ER filter and the window method, they can satisfy the spectrum standard with a relatively small number of taps.

In short, if the filtering units 440 and 450 use the SRRC filters, they require an SRRC filter having more than 500 taps to satisfy the spectrum standard when the up-sampling rate is 4. However, if the filtering units 440 and 450 use the ER filters, they can satisfy the spectrum standard only with an ER filter having more than 100 taps.

Therefore, with the modulating apparatus, it is possible to fabricate an on-channel repeater having small time delay where time delay between an output signal of the on-channel repeater and an output signal of the main transmitter is small.

As described above, a method of the present invention can be embodied as a program and stored in a computer-readable recording medium, such as CD-ROM, RAM, ROM, floppy disks, hard disks, and magneto-optical disks. Since this process can be implemented by those of ordinary skill in the art of the present invention, detailed description on it will not be provided herein.

While the present invention has been described with respect to certain preferred embodiments, it will be apparent to those skilled in the art that various changes and modifications may be made without departing from the scope of the invention as defined in the following claims.

What is claimed is:

1. A modulating apparatus of an on-channel repeater which receives a signal on one channel and distributes the signal on the same channel, comprising:
    a baseband signal configuring means for configuring a baseband signal by combining an input field and a segment sync signal;
    a pilot adding means for adding a pilot signal to the baseband signal;
    an up-sampling means for up-sampling the baseband signal with the pilot signal added thereto;
    a filtering means for filtering the up-sampled baseband signal with the pilot signal added thereto, wherein the filtering means generates an in-phase (I) signal and a quadrature (Q) signal and performs filtration;
    a first digital-to-analog converting means for converting the filtered in-phase (I) signal into a first analog signal;
    a second digital-to-analog converting means for converting the filtered quadrature (Q) signal into a second analog signal;
    a first radio frequency (RF) up-converting means for directly up-converting the first analog signal into a first RF signal;

a second radio frequency (RF) up-converting means for directly up-converting the second analog signal into a second RF signal;

an adding means for adding the up-converted first and second analog signals;

wherein the filtering means uses a window method using window functions of Kaiser, Hamming, Hanning, and Blackman.

2. The modulating apparatus as recited in claim 1, wherein the filtering means includes an Equi-Ripple (ER) filter.

3. The modulating apparatus as recited in claim 1, wherein the filtering means includes a square root raised cosine (SRRC) filter.

4. A modulating method of an on-channel repeater which receives a signal on one channel and distributes the signal on the same channel, comprising:

baseband signal configuring step of configuring a baseband signal by combining an input field and a segment sync signal;

a pilot adding step of adding a pilot signal to the baseband signal;

an up-sampling step of up-sampling the baseband signal with the pilot signal added thereto;

a filtering step of filtering the up-sampled baseband signal with the pilot signal added thereto, wherein said filtering generates an in-phase (I) signal and a quadrature (Q) signal and performs filtration;

a first digital-to-analog converting step converting the filtered in-phase (I) signal into a first analog signal;

a second digital-to-analog converting step converting the filtered quadrature (Q) signal into a second analog signal;

a first radio frequency (RF) up-converting step directly up-converting the first analog signal into a first RF signal;

a second radio frequency (RF) up-converting step directly up-converting the second analog signal into a second RF signal;

adding the up-converted first and second analog signals;

wherein, the filtering step, utilizes a window method using window functions of Kaiser, Hamming, Hanning, and Blackman.

5. The modulating method as recited in claim 4, wherein, the filtering step, an Equi-Ripple (ER) filter is used.

6. The modulating method as recited in claim 4, wherein, the filtering step, a square root raised cosine (SRRC) filter is used.

* * * * *